July 2, 1963   R. A. GROSSELFINGER ET AL   3,095,701
GAS TURBINE POWER PLANT CONTROL SYSTEMS
Filed April 4, 1960   3 Sheets-Sheet 1
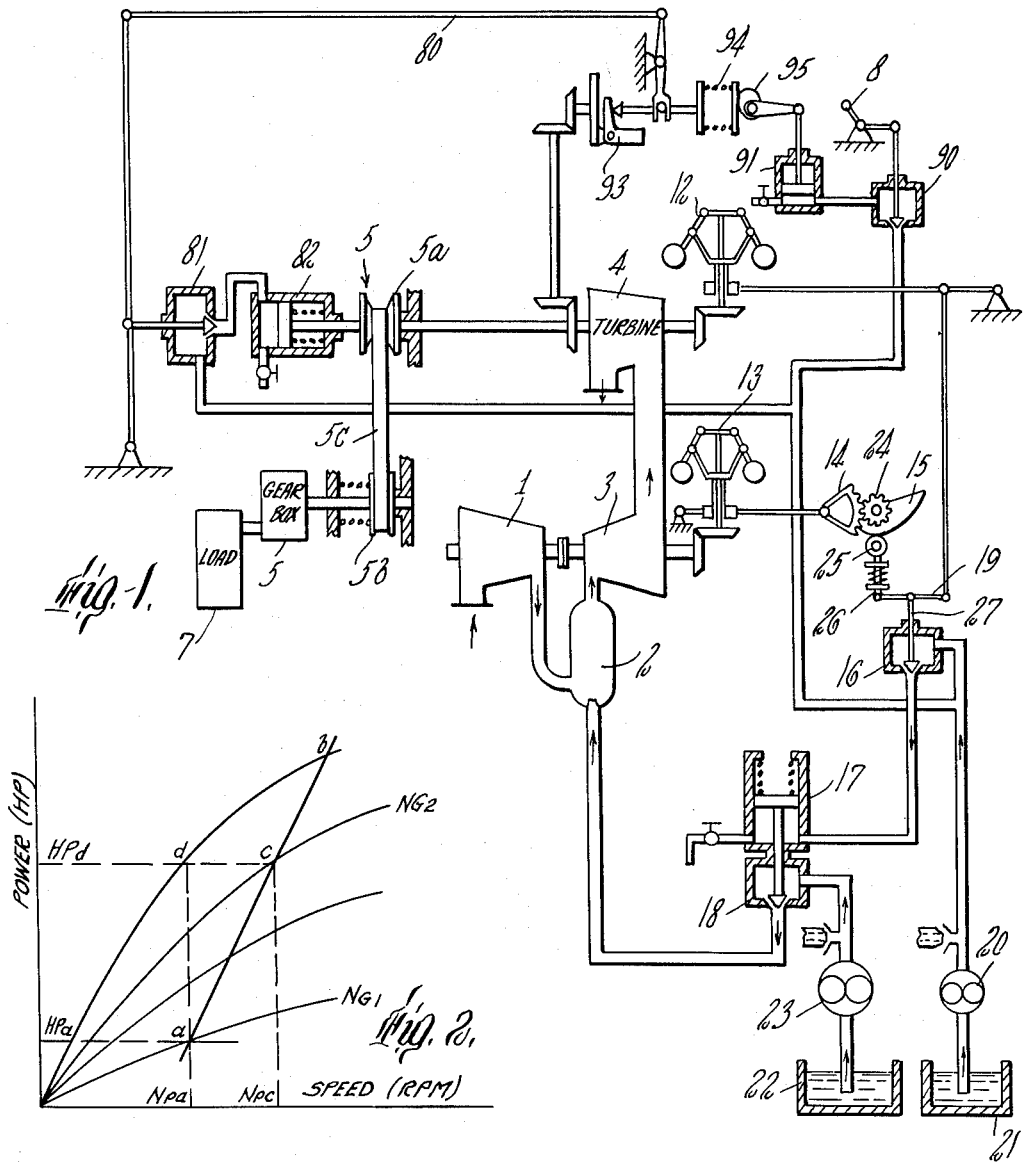
Fig. 1.
Fig. 2.
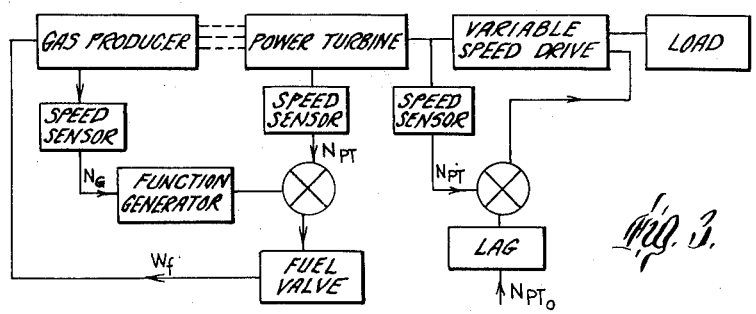
Fig. 3.

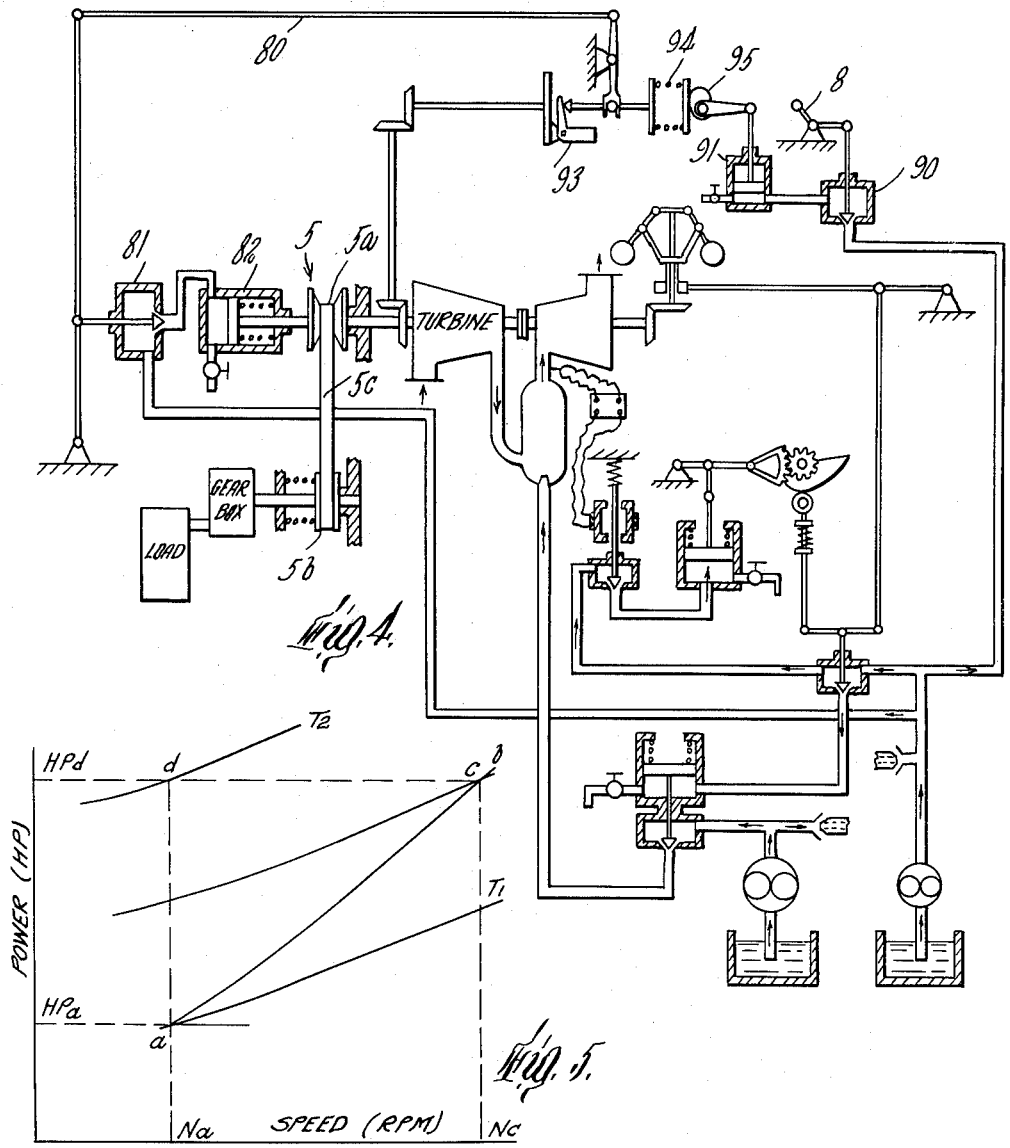
Fig. 4.
Fig. 5.
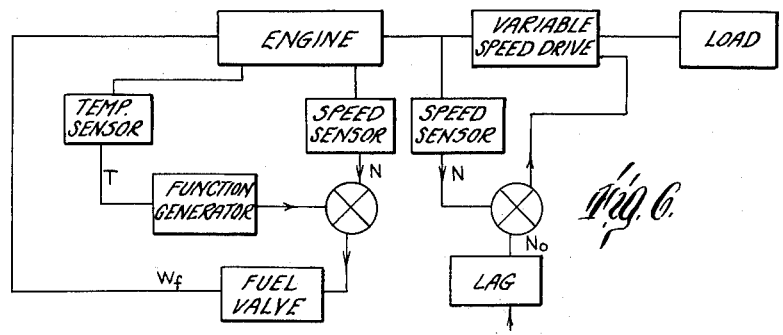
Fig. 6.

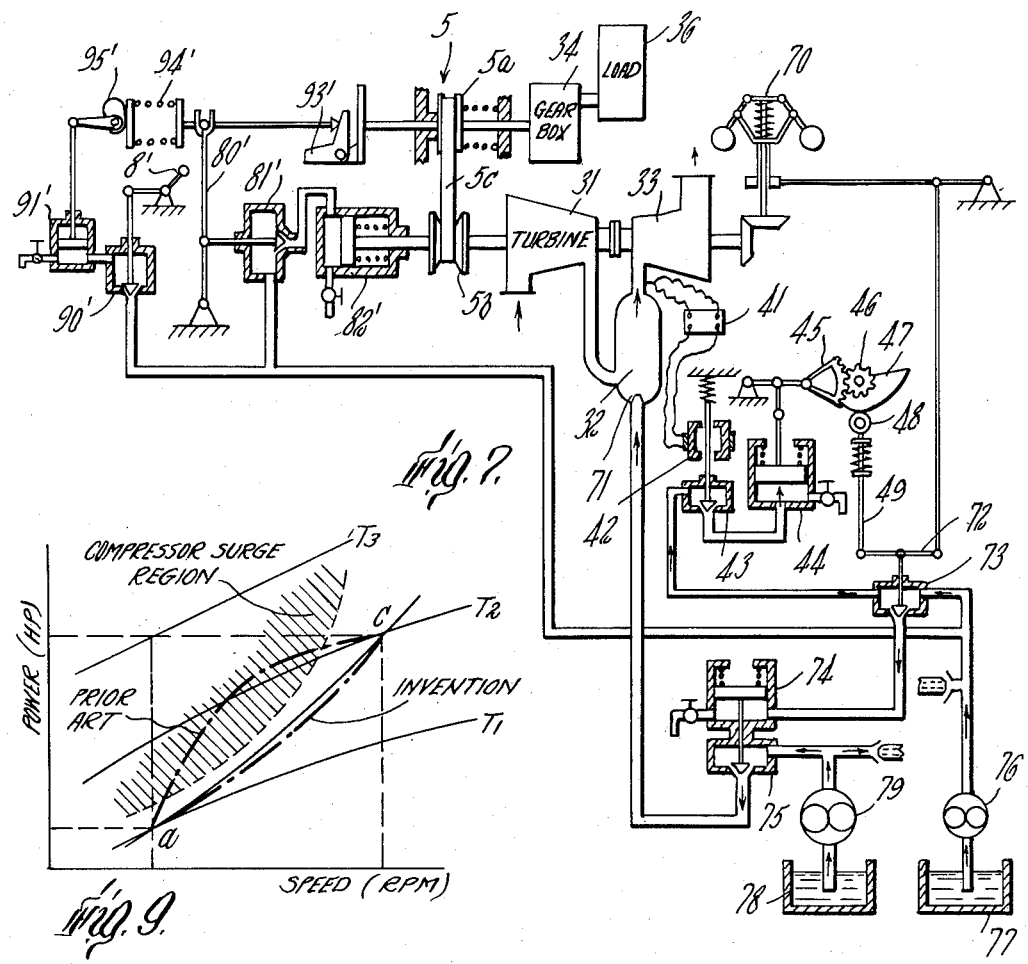
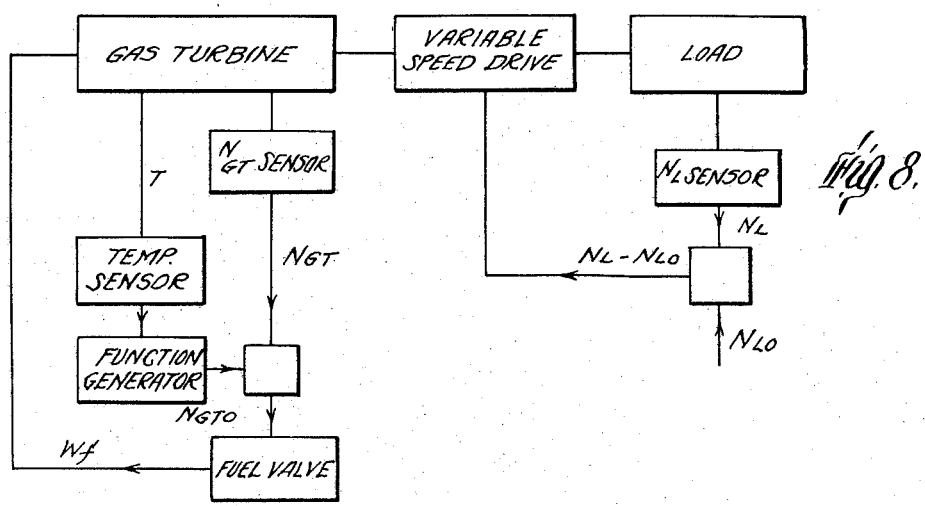

United States Patent Office 3,095,701
Patented July 2, 1963

3,095,701
GAS TURBINE POWER PLANT CONTROL SYSTEMS
Robert A. Grosselfinger, Washington, D.C., and Jacques J. Schoch, Seattle, Wash., assignors to The Garrett Corporation, Los Angeles, Calif., a corporation of California
Filed Apr. 4, 1960, Ser. No. 19,711
13 Claims. (Cl. 60—39.28)

This invention relates to gas turbines, and more particularly to gas turbine power plant systems especially useful for driving varying loads.

With gas turbine power plant systems, it is desirable that the power plant be operated at as high efficiency as possible, since it is known that fuel consumption rises at a tremendous rate if the turbine is not so operated. However, the most efficient operation of a turbine power plant frequently takes place in a region of turbine operating characteristics close to that region in which the phenomena of "compressor surge" takes place, such "compressor surge" resulting in a completely uncontrolled operation of the turbine power plant which frequently causes structural failure.

Hence the operation of a gas turbine near the region of its greatest efficiency has heretofore been a problem in the art even with the best of control systems, and it has been universal practice to operate a turbine in a region well removed from "compressor surge" phenomena so that there was no danger of such occurring, the penalty of lower efficiency and higher fuel consumption being considered a necessary evil.

Furthermore, the speed of a load device operating at a given load may not be and usually is not that speed at which the most efficient operation of the turbine occurs at that load. Generally, the relationship between load device speed and driving turbine speed varies over the range of contemplated load in a manner other than linear, and may even be in opposite direction as, for example, in a land or water vehicle, wherein high power is frequently required for acceleration at low speed. Under such circumstances, conventional gas turbine gear drives represent a compromise valid for one condition only, so that the turbine driving the external load is operating inefficiently at all other load conditions.

Accordingly, it is an object of the present invention to provide a turbine power plant-variable speed drive system and control which will for the first time permit operation of a turbine in a region closely adjacent to the region of "compressor surge" thus resulting in greatly increased efficiency and lower fuel consumption and one that will do so while maintaining an interrelation between driving turbine and load speed such that driving turbine speed is that speed providing most efficient operation at the momentary load applied.

It is a feature of the invention that by its use the turbine power plant system is automatically operated closely to follow a predetermined relationship between selected operating characteristics, enabling it to be operated, for example, along the maximum efficiency operating line of the system and with close adherence thereto during transients, if so desired.

It is another feature of the invention that the turbine is unloaded momentarily to increase turbine speed upon an increase in power demand so that any momentary departure from its predetermined line of operating relationship during a power increase, such as is created by an input signal upset introduced by its manual control, will be in a direction away from compressor surge. This is especially important in transient operation during power increases because it permits much closer operation to the compressor surge region, and hence higher efficiency, than has heretofore been possible with safety.

For the purpose of fully describing preferred embodiments of our invention, reference is now made to the following specification together with the accompanying drawings, in which:

FIG. 1 is a diagrammatic view of a turbine-variable speed drive power plant system and control embodying our invention;

FIG. 2 is a graph representing performance characteristics typical of a system of the type of FIG. 1;

FIG. 3 is a block diagram of the system and control of FIG. 1;

FIG. 4 is a diagrammatic view of a modified turbine-variable speed drive power plant system and control of our invention;

FIG. 5 is a graph representing performance characteristics typical of a system of the type of FIG. 4;

FIG. 6 is a block diagram of the system and control of FIG. 4;

FIG. 7 is a diagrammatic view of a modification of the systems and controls of FIGS. 1 and 4;

FIG. 8 is a block diagram of the system and control of FIG. 7, and

FIG. 9 is a graph showing the transient operation of the systems of the invention to unload the turbine to allow its speed to increase and so insure its operation during a power increase on the side of the operating line away from the compression surge region, as contrasted with prior art system operations.

Referring first to FIG. 1, the invention may be used with any one of a number of types of gas turbine power plants, that shown in FIG. 1 being of the type having a gas generator portion and a power turbine portion mechanically independent thereof and energized by the hot gases therefrom, fuel normally being supplied only to the gas generator portion of the turbine. In such a turbine power plant, atmospheric air enters the gas generator compressor 1 where it is compressed to some desired pressure. The compressed air then passes to the combustion chamber 2 where fuel is introduced through fuel nozzle 11 and is burned in the compressed air to obtain a desired turbine inlet temperature. The combustion gases and excess air then enter the gas generator high pressure turbine 3 and are partially expanded to provided the energy to drive the gas generator compressor 1 connected to said turbine 3. The partially expanded gas-air mixture is then passed to the power turbine portion of the turbine power plant and is further expanded through the power turbine low pressure turbine 4 which turbine is mechanically independent of the compressor-high pressure turbine combination. Other types of gas turbine power plants, such as, for example, the single shaft type of turbine, may as well be used with the invention, all as hereinafter more fully explained, all of such turbines being well understood in the art.

In accordance with the present invention, the power derived in the expansion through the power turbine low pressure turbine 4 is transmitted through a variable gear ratio speed drive of any known type in which the drive speed is varied and controlled by means of a manually operable control means including speed sensing means and manually settable governor means operated by a demand lever 8 for application of a desired power load 7 which may, for example, be any one of a large number of machines, vehicles, or the like, such as stationary machinery, as with electric generators, or vehicles such as trucks, boats, etc., especially those providing a variable load. The variable gear ratio speed drive, as hereinafter more fully explained, in essence provides a means of controlling the application of load on the turbine power plant so that it may be applied at a desired turbine speed and also provides means whereby transient operation between two operating points may be controlled by initially unloading the turbine. This is tremendously important, and provides, in combination with the automatic control system hereinafter described, for the first time, a means of operating a gas turbine power plant system at optimum efficiency in spite of a varying load thereon, as well as means of obtaining accelerating transients on the side of the desired operating line away from the compressor surge region, instead of the same side as has heretofore been the case, by controlling the rate relationship of its two control loops and initially unloading the gas turbine for its acceleration (FIG. 9).

For complete understanding of the subject matter of the present invention, the concepts of an engine operating manipulated variable and of an engine operating characteristic must be defined in accordance with their specific meanings as hereinafter used to define applicant's invention. Accordingly, the term "engine operating manipulated variable" is defined as a quantity which is determined by manipulating it from outside the engine, either manually or by a control, a typical example thereof being fuel flow or gear ratio. On the other hand, the term "engine operating characteristic" is a quantity which is determined or generated by the engine itself, such as, for instance, turbine inlet temperature, gas generator or turbine speeds, pressure ratios, etc., and combinations thereof, which are not directly controlled except through one or more engine operating variables. Thus, the engine operating manipulated variables indirectly control the engine operating characteristics generated by the engine, but such engine operating characteristics are not themselves directly controlled, nor are the manipulated variables generated by the engine. Neither fuel flow nor load, then, can under any circumstances function as engine operating characteristics. The novel unloading of the turbine upon acceleration is accomplished by applying the manually settable control means to the variable speed drive means rather than to the fuel flow means, so that the power turbine speed will tend to increase faster than the gas generator speed. This is because only through the use of the variable speed drive means initially to increase turbine speed by unloading the turbine can the turbine power plant system be operated during a power increase to increase fuel flow upon an initiating turbine speed increase, rather than the contrary as is the usual case. It is this novel operation during a power increase, i.e. increase in turbine speed followed by fuel flow increase, that makes possible the transient operation on the side of the operating line away from compressor surge.

In FIG. 2 is shown a graphical representation of the performance characteristic typical of the above-described type of turbine power plants wherein the horsepower output of the power or low pressure turbine is plotted against the power turbine speed with speeds of the gas generator or compressor-high pressure turbine combination plotted as parameters.

Referring now to the heretofore known turbine power plant control systems but including the variable gear ratio speed drive aspect of the invention, assume point ($a$) on the graph of FIG. 2 to be the initial steady state power point. If a higher power be desired, the operator, by operating his control lever might attain a range of power output at a power turbine speed $N_{pa}$ which could be maintained substantially constant either by his simultaneously operating a throttle or by means of an automatic speed control which controlled the fuel flow to the gas generator to maintain constant speed independently of the load, the operation being shown by line $a$—$d$ of FIG. 2. However, even with a system employing an automatic speed control and a variable gear ratio drive, in order to derive desired powers at optimum efficiency as shown by the line $a$—$b$ of FIG. 2, rather than at constant speed, it is necessary for the operator to manipulate more or less simultaneously both power plant system control levers, that is the variable speed control lever and the throttle or speed control lever in order to achieve power changes.

Although such a system permitted the control of the overall power plant system in accordance with a desired steady state operation on any arbitrarily selected operating line, such as, for example, line $a$—$b$ of FIG. 2, it not only required two levers to be controlled by an operator but it also in no way defined the transient operation between such two points, and thereby permitted combinations of speed and temperature during a transient which frequently encroached on the turbine "compressor surge" region, thereby jeopardizing safe operation as heretofore explained. Hence, to avoid "compressor surge" it was considered good practice both to operate the turbine in a region well removed therefrom, or to employ limiting devices to superimpose a limiting function upon the normal control function.

As a more detailed example of heretofore known practice, consider an increase in power from $HP_a$ to $HP_c$ or $HP_d$ assuming the power turbine speed to be $N_{pa}$. In such case the variable speed lever might be operated to increase the load on the turbine with the power turbine speed lever, the throttle, left unchanged. However, under such conditions, the power turbine speed was then momentarily reduced causing a greater fuel flow because of the speed control, and the higher energy level available would then increase the speed of the gas generator to a speed $N_{G2}$, as well as indirectly lifting the energy level to the power turbine, until such time as the power turbine speed regained the speed $N_{pa}$ at the increased load and the power output $HP_d$ was derived. This power, however, was derived at other than optimum efficiency and could only be derived at optimum efficiency by resetting the speed control to a power turbine speed $N_{pc}$ in order that the same power $HP_d$ be attained but at optimum power plant system efficiency. Nevertheless, during such a transient there was no correlation whatsoever between instantaneous values of turbine operating characteristics and the transient could take place along any line, the shape of which depended, among other things, upon the relative speeds of response of the two control loops involved. With this system, the upset transient took place on the left side of the steady state line $a$—$b$ between steady state and compressor surge, as this increase in load could only be compensated for by a rise in turbine inlet temperature and the lines of increasing turbine inlet temperature are in a direction towards surge. Thus, it may be seen that simultaneous manipulation of the variable speed lever and speed control was required to remain on an overall optimum operating line such as $a$—$b$.

According to our invention, then, we employ power plant system control means in addition to and in combination with a continuously variable gear ratio device means including, for example, a function generator of mechanical or other type, responsive to changes in at least two selected turbine power plate operating characteristics to maintain a predetermined relationship therebetween by controlling the fuel flow to the turbine or some other engine operating manipulated variable. Thus, the turbine power plant is automatically controlled in accordance with any desired relationship, such as line $a$—$b$ of FIG. 2, for example, during transient as well as steady state operation since one variable is controlled as a function of the other. The gas turbine is also controlled so that acceleration transients take place on the side of the steady state line away from the compressor surge region due to the novel unloading during power upsets to increase power, which causes the demand to be compensated for by lower turbine inlet temperatures. The turbine power plant system engine operating characteristics, any two of which may be employed for its control are, as set forth above in more detail, for example, turbine speeds, temperatures, pressures and combinations thereof, which characteristics are varied indirectly by changes in engine operating manipulated variables as above set forth in more detail, herein turbine load or variable speed drive output speed. Thus the turbine power plant system, which term is intended to include the turbine-variable gear ratio speed drive-load system, is automatically controlled in accordance with any desired relationship, for example, a relationship corresponding to a curve of optimum system efficiency.

With our novel arrangement, the fuel flow to the turbine power plant is directly controlled solely by selected turbine operating characteristics, which characteristics are indirectly affected by changes in load. Thus, automatic operation is provided, for example, at optimum efficiency whatever the load condition imposed at a selected speed upon the turbine or selected speed condition imposed on the load by manipulation of the lever 8.

In general, the novel gas turbine power plant control system of our invention includes in combination with a variable gear ratio drive means interposed between the turbine and its load, both a manually variable control system and an automatically variable control system, both comprising in effect information feedback loops including the power plant therein. The loops otherwise are not connected except on a time basis, as is essential for best adherence to the predetermined line of operating relationship between the two selected engine operating characteristics establishing the range of power output along said line. That is, the loops are preferably constructed and arranged to have a predetermined rate of information input to the manually variable control system loop such that the predetermined rate of operation of the automatically variable control system is at least as fast as and preferably somewhat faster than the rate of operation of the manually variable control system when information, as by displacement of an operating control such as demand speed lever 8 is fed into the manually variable control system loop to select a desired point for engine operation. By so interrelating the operation of the two feedback control loops of the control system of the invention, the maintaining of said engine operating characteristics substantially along said predetermined line of operating relationship during a change in power to said desired operating point on said line of operating relationship and the providing of substantial adherence to said line during a power change is made possible.

The manually variable loop includes desired load or engine operation demand means, such as lever 8; input actuator means, such as pilot valve 90 and servo valve operable thereby, preferably used to introduce a time lag and so limit the maximum rate of demand signal input in accordance with the principles of the invention; sensing means settable by the lever 8, such as speed governor 93 acting upon a spring 94 which may be set by a cam 95 in turn operated by the demand signal, the load or engine characteristic being compared to the imposed demand signal by such means; and control means for varying the speed relationship between the gas turbine and load, such as a variable speed drive suitably connected to the manually settable sensing means as is hereinafter more fully described.

The automatically variable loop in general includes a pair of sensing means and suitable interconnecting means, as hereinafter more fully described, for comparing the output of one in terms of the other in accordance with the predetermined line of operating relationship to control the other selected engine operating manipulated variable, fuel flow, both to maintain the engine operating conditions at the selected point defining a desired power output and, during power changes, to provide adherence to the predetermined line of operating relationship by operation of said loop at a rate at least as fast as the rate of operation of the manually controlled loop.

Referring again to FIG. 1, a conventional flyball governor 12 is driven through suitable gears by the power turbine 4 and provides a speed sensing device for said turbine, which speed is a typical turbine operating power characteristic which may be selected for its control. Movement of the sleeve of such governor (which movement is proportional to the speed of the power turbine) is transmitted through a suitable linkage of one end of the arm 19 of a comparison generator, the center of which arm is connected through a link 27 to operate a pilot valve 16 which together with servo valve 17 and main fuel valve 18 provide a fuel flow control to regulate the fuel flow to the fuel nozzle 11 in the combustion chamber 2. The pilot valve 16 and servo valve 17 are provided with a suitable source of operating fluid through pump 20 and reservoir 21 and fuel is supplied to main fuel valve 18 from a tank 22 by means of pump 23.

A second flyball governor or speed sensing means 13 is operated from the shaft of the gas generator turbine 3 through suitable gears and provides a displacement proportional to the gas generator speed, which speed provides a second turbine operating characteristic which may be selected for its control, although other turbine operating characteristics, such as turbine inlet temperature, could be used if desired. Such displacement is transmitted through suitable linkage to toothed quadrant member 14 arranged to drive a rotatably mounted pinion 24. A cam 15 mounted on a common shaft with said pinion is provided as a function generator, such cam defining a predetermined relationship between the gas generator and power turbine speed, the selected engine operating characteristics, to provide a desired operating relationship between such selected operating characteristics, as shown by the line a—b in FIG. 2, for example, so that movement of cam follower 25 associated with such cam 15 is in terms of the speed of the power turbine 4, such movement being transmitted to the other end of arm 19 through linkage 26. The displacement of linkage 26 at one end of arm 19 represents a desired power turbine speed as a function of the predetermined relationship, for example, expressed by the line a—b of FIG. 2, and such displacement is in effect added or subtracted from the displacement of said arm caused by the power turbine linkage. As a result, any combination of gas generator and power turbine speeds inconsistent with the relationship established by the line a—b will result in movement of link 27 mounted at the center of arm 19 and hence in a displacement of pilot valve 16 which will cause the fuel flow to vary until such time as the relative speeds are consistent with the desired relationship as established by the function generating cam 15.

The manually variable control portion of the system of the invention, as above described, includes a generally well-known variable speed drive with a variable gear ratio, said drive providing, according to the present invention, a continuously variable gear ratio between its input and output shafts, a lever 8 through which a desired signal is fed into the control, the input to lever 8 to be controlled as to rate in order that the desired signal imposed by said input will be followed instantaneously. This may be accomplished either by a human operator, since human responses have a known minimum value, or by suitable actuators known to the art. Such an actuator as shown in FIG. 1 being of the fluid type comprising a valve 90 operable by lever 8 to position a spring mounted piston of servo valve 91 by virtue of pressure differences imposed thereon by said valve 90 and an orifice in the piston chamber of servo valve 91. A flyball governor sensing means 93, actuated as shown from the shaft of the gas turbine at the input to the variable speed drive generally designated 5, or from the load shaft at the output of the variable speed drive as shown in FIG. 7, and settable by lever 8 as described above is connected by a suitable linkage 80 to the variable speed drive pilot valve 81 which is in turn connected to a servo motor 82 which changes the gear ratio of the variable speed drive 5 in response to the error signal between desired and measured speed signal at governor 93 transmitted by linkage 80. The variable speed drive may be of any type known to the art and is here shown as a pair of conical pulleys 5a and 5b with a suitable belt 5c trained between them, the pulley sides being relatively movable in an axial direction to change their relative diameters and hence their gear ratio.

It is the control of rate of information input, together with the automatic control provided by the function generator, which makes possible both adherence to a predetermined line of operating relationship during power transients, while the use of a continuously variable gear ratio drive makes possible the establishment of a desired turbine speed, irrespective of the load imposed or its speed of rotation. Thus, any manipulation of lever 8, establishes a desired power plant system speed to establish or absorb the load, all at optimum turbine efficiency and without danger of encroaching into the compressor surge region.

FIG. 3 is a block diagram of the structure more completely shown in FIG. 1. It may be seen in FIG. 3 that a change in desired power turbine speed $N_{PT_O}$ is compared to actual power turbine speed $N_{PT}$ and this either increases or decreases the load on the power turbine depending on whether the upset is positive or negative. The change in load on the power turbine changes the sensed power turbine speed as fed to the comparator where actual power turbine speed is compared to the output of the function generator which computes desired power turbine speed in the automatic part of the control system, this error being imposed on the fuel valve until the power output of the power turbine is that which corresponds under steady state conditions to $N_{PT_O}$.

Referring again to FIG. 2, in order to show the operation of the above-described structure, it may first be assumed that the initial steady state operating point is point (a). If the operator demands a higher power output from the gas turbine power plant by demanding a free turbine speed corresponding to the power he desires through manipulation of his lever 8, the decreased load on the power turbine 4 will cause it to increase speed and at a rate faster than the gas generator. Such increase in speed is sensed by the speed sensing devices 12 which will result in an upward movement of the pilot valve 16 and an increase in fuel flow to the gas generator combustion chamber. The speed of the gas generator then increases due to the increase in its turbine inlet temperature. Such increase in speed is sensed by the gas generator speed sensing device 13 as a displacement applied to the cam 15. Because of the rate control imposed on the manual and automatic loops, the output of cam 15 should closely follow the increase in free turbine speed due to the load manipulation. Adherence to the optimum operating line a—c shown in FIG. 2 depends on rate interrelationship. As the power plant moves from point a to c, the increased fuel flow increases the output energy of the gas producer until the power turbine speed asked for is reached. When the desired speed is reached, the power plant because of its adherence to the operating line a—c should also be at corresponding gas generator speeds and output power. Consequently the error signal into the variable speed drive is zero and the input and output power of the drive is the same.

The system described in the foregoing can be modified in that both the gas generator and power turbine may be again provided with speed sensing units, but the gas generator speed computed from the power turbine speed by means of a function generating cam operated by the power turbine speed sensing device.

Referring now to FIG. 4, the invention is shown as applied to a single shaft turbine power plant in which the compressor section and the turbine section are directly, mechanically connected. In such a turbine power plant atmospheric air enters the engine compressor 31 where it is compressed to some desired pressure. The compressed air then passes to the combustion chamber 32 where fuel is introduced through fuel nozzle 71 and is burned in the compressed air to obtain a desired turbine inlet temperature. The combustion gases and excess air then enter the turbine 33 where they are expanded to provide energy to drive the compressor 31 as well as to provide excess energy available for transmission through variable speed drive 34 in which the drive speed is varied as described above for application of available power to the load 36 the load provided being of the type heretofore described. The variable speed drive may be controlled by means of a lever 8 operating in the manner of FIG. 1, and, since this portion of the system is identical with that of FIG. 1, its reference numerals have been made identical so that its description need not be repeated here.

In FIG. 5 is shown a graphical representation of the performance characteristics typical of the above described turbine power plant wherein the horsepower output of the power plant system is plotted against the power plant system speed with turbine inlet temperatures plotted as parameters.

FIG. 6 is a block diagram pertaining to FIGS. 4 and 5. In FIG. 6, it may be seen as before that a desired power output for the gas turbine is established by setting a desired gas turbine speed corresponding to that power. This signal established by setting the desired turbine speed, after a suitable time lag imposed through its input actuator or otherwise, is compared with the actual gas turbine speed. The error signal produced by this comparison changes the gear ratio of the variable speed drive as is above described. Thus, if a higher speed is desired ($N_o$), the variable speed drive gear ratio is changed so that the gas turbine is unloaded with a consequent increase in speed (N). This reduces the error of the manual loop. However, in the automatic loop the increased speed (N) is more than the computed output of the function generator. This signal increases the fuel flow to the turbine to further increase its power until the transient is completed when the gas turbine is at a power level at the desired higher speed ($N_o$) on the operating line.

FIGS. 7 and 8 are, respectively, a schematic and a block diagram of a system wherein a load speed is demanded. This system differs from the configurations of FIGS. 1 and 4 in that in the system of FIG. 7 a load speed is demanded irrespective of the turbine power at that speed. The structure of FIG. 7 is identical to that of FIG. 4 except for the sensing of load speed, that is, output speed of the variable speed drive 5, rather than turbine speed, this being accomplished by a governor 93' with its spring 94' and cam 95' as described above with reference to FIGS. 1 and 4. In FIG. 7, the reference numerals applied to the manual loop portion of the system, being applied to elements identical to those of FIGS. 1 and 4, have been given prime marks but otherwise correspond to those of FIGS. 1 and 4 as does the description of the operation of that portion of the system except as is directly above set forth.

In FIG. 8 is shown a block diagram of the system of FIG. 7 wherein it may be seen that a desired load speed ($N_{Lo}$) is compared to an actual load speed ($N_L$). Assuming that a situation arises in which the desired load speed ($N_{Lo}$) has not been changed but that the actual load speed drops, as would be the case with a vehicle which suddenly started uphill, the upset caused by the momentary reduction in vehicle speed would introduce an error signal to the variable speed drive, changing the gear ratio between turbine and load to unload the turbine. The resulting higher turbine speed would result in opening the fuel valve and hence raising the power output of the turbine. The transient would be complete when the turbine output power is sufficient to drive the load again at the desired load speed.

Referring more specifically to the automatic loop portion of FIGS. 4 and 7, a conventional flyball governor 70 is driven through suitable gears by the turbine 33 and provides a speed sensing device for said turbine power plant, which speed is a typical turbine power plant operating characteristic which may be selected for its control. Movement of the sleeve of governor 70 is transmitted through a suitable linkage to one end of the arm 72 of a comparison generator, the center of the arm 72 of which is connected through a link to operate a pilot valve 73 which together with a servo valve 74 operates main fuel valve 75 to regulate the fuel flow to the fuel nozzle 71 in the combustion chamber 32. The pilot valve 73 and servo valve 74 are provided with a suitable source of operating fluid through pump 76 and reservoir 77, and fuel is supplied to main fuel valve 75 from a tank 78 by means of pump 79.

To provide a second turbine power plant operating characteristic in the arrangement employing a single shaft type or turbine, we prefer to select turbine inlet temperature, such temperature being sensed by a thermocouple 40 whose output is amplified by the amplifier 41 in a known manner, although other turbine operating characteristics, such as compressor pressure ratio, could be used. The amplifier output according to our invention is arranged to control a positioning solenoid 42 which introduces the temperature signal to a pilot valve 43 which, together with servo valve 44, provides a displacement proportional to the turbine inlet temperature. Such displacement is transmitted through suitable linkage to a toothed quadrant member 45 which drives a rotatably mounted pinion 46. A cam 47 mounted on a common shaft with said pinion is provided as a function generator, such cam defining a predetermined relationship between the turbine power plant system speed and the turbine inlet temperature to provide a desired operating relationship between such selected operating characteristics, as shown by the line a—b in FIG. 4, for example, so that movement of the cam follower 48 associated with such cam 47 is in terms of the speed of the turbine power plant, such movement being transmitted to the other end of arm 72 through linkage 49. Thus the displacement of linkage 49 at one end of arm 72 represents a desired turbine power plant speed as a function of the predetermined relationship. This displacement is in effect added or subtracted from the displacement of said arm caused by turbine power plant speed linkage, and as a result, any combinations of turbine inlet temperatures and turbine power plant speed inconsistent with the relationship established by the line a—b will result in movement of the pilot valve 73 mounted at the center of arm 72 and hence in a displacement of the servo valve 74 which causes the fuel flow to vary until such time as the turbine power plant speed and the turbine inlet temperature are consistent with the desired relationship as established by the function generating cam 47.

The arrangement may be somewhat modified from that of FIGS. 4 and 7 in that the output of the speed sensing unit may be arranged to operate the function generator, the output of the temperature sensing means being applied directly to the comparison generator.

Thus it will be seen that by our invention we are enabled for the first time to control the entire turbine power plant system solely through the direct control of either the load or the variable speed drive. Furthermore, our invention permits automatically attaining any predetermined operating relationship between selected power plant system operating characteristics, which relationship normally is a curve of optimum efficiency and maintaining close adherence thereto during power increases and on the side of the operating line away from the compressor surge region as may be seen in FIG. 9.

Various other modifications within the spirit of our invention and the scope of the appended claims will be apparent to those skilled in this art.

This application is a continuation-in-part of our application Serial No. 690,869, filed October 17, 1957, now abandoned which is in turn a continuation-in-part of our application Serial No. 418,545, filed March 25, 1954, now abandoned.

We claim:

1. A gas turbine power plant system including a variable fuel input, an output shaft for driving a load, and a control system comprising means for sensing first and second engine operating characteristics, control means connected to both of said sensing means and said variable fuel input for determining the fuel supply rate to maintain a predetermined line of relationship between said characteristics under steady state conditions throughout the power range of the power plant, means for selecting a desired power output and thus an operating point on said line, and a variable speed ratio transmission, controlled by said last named means for unloading said output shaft during a transient upset caused by selection of higher power output level, whereby during such transient upset said speed will recover faster than said characteristic.

2. A gas turbine power plant system as claimed in claim 1 wherein said means for selecting a desired power output includes speed sensing means and manually settable governor means for selecting a desired operating point on said line of relationship.

3. A gas turbine power plant system as claimed in claim 2 wherein said speed sensing means senses a turbine speed.

4. A gas turbine power plant system as claimed in claim 2 wherein said speed sensing means senses the ratio of turbine input speed to variable speed ratio drive means speed.

5. A gas turbine power plant system as claimed in claim 2 wherein said speed sensing means senses the output speed of said variable speed ratio drive means.

6. A gas turbine power plant system as claimed in claim 1, further including first and second sensing means for sensing two selected engine operating characteristics generated by said power plant in accordance with said line of relationship, and including function generator means establishing said line of relationship between said two engine operating characteristics, said function generator means being operatively connected to the first of said sensing means to provide an output in terms of the output of the second of said sensing means, comparison generator means connected to said function generator means, said second sensing means and said fuel input means for comparing the output of said function generator and said second sensing means to provide a combined error signal output effective directly to control said fuel flow in accordance with said line of relationship.

7. A gas turbine power plant system as claimed in claim 6 wherein said first and second sensing means are temperature sensing means and speed sensing means.

8. A gas turbine power plant system including a gas turbine power plant having a variable fuel input, automatically operable control means for said variable fuel input for controlling operation of said turbine along a predetermined line of relationship between two engine operating characteristics under steady state conditions throughout the power range of the power plant, variable speed ratio means connected to said power plant for driving a load thereby and manually operable control means for said variable speed ratio means including speed sensing means and manually settable governor means for selecting a desired operating point on said line of relationship, said automatically operable control means having a predetermined rate of operation during power changes along said line of relationship which is at least as fast as the rate of operation of said manually operable control means, with a momentary upset applied by said manually operable control means upon a power increase operating to increase turbine speed by unloading said turbine maintaining power plant operation along said line on the side thereof in the direction of higher turbine speed during said power increase.

9. A gas turbine power plant system as claimed in claim 8 wherein said speed sensing means is connected to said turbine power plant.

10. A gas turbine power plant system as claimed in claim 8 wherein said speed sensing means is connected to said load.

11. A gas turbine power plant system including a gas turbine power plant having a variable fuel input, automatically operable control means for said variable fuel input for controlling operation of said turbine along a predetermined line of relationship between two engine operating characteristics under steady state conditions throughout the power range of the power plant, variable speed ratio means connected to said power plant for driving a load thereby and manually operable control means for said variable speed ratio means effective to define a desired operation point on said line of relationship including speed sensing means and manually settable governor means for selecting a desired operating point on said line of relationship, said manually operable control means being effective to unload said power plant to increase its speed in response to an accelerating momentary upset introduced by setting said governor means to a higher power level, with said unloading being followed by an increase in fuel flow to said power plant during a power increasing transient, maintaining power plant operation along said line on the side thereof in the direction of higher turbine speed during said power increase.

12. A gas turbine power plant system including a variable fuel input, an output shaft for driving a load, and a control system comprising means for sensing the speed of the output shaft, means for sensing an engine operating characteristic, control means connected to both of said sensing means and said variable fuel input for determining the fuel supply rate to maintain a predetermined line of relationship between said speed and said characteristic under steady state conditions throughout the power range of the power plant, means for selecting a desired power output and thus an operating point on said line, and a variable speed ratio transmission, controlled by said last named means, for unloading said output shaft during a transient upset caused by selection of higher power output level, whereby during such transient upset said speed will recover faster than said characteristic.

13. A gas turbine power plant system including a variable fuel input, an output shaft for driving a load, and a control system comprising means for sensing an engine operating characteristic, control means connected to both of said sensing means and said variable fuel input for determining the fuel supply rate to maintain a predetermined line of relationship between engine characteristics under steady state conditions throughout the power range of the power plant, means for selecting a desired power output and thus an operating point on said line including speed sensing means and manually settable governor means, said control means having a predetermined rate of operation during power changes along said line of relationship at least as fast as said last named means, and a variable speed ratio transmission, controlled by said last named means, for unloading said output shaft during a transient upset caused by selection of a higher power output level, whereby during such transient upset said speed will recover faster than said characteristic, maintaining power plant operation along said line on the side thereof in the direction of higher turbine speed during a power increase to said higher power output level.

References Cited in the file of this patent

UNITED STATES PATENTS

| | | |
|---|---|---|
| 2,346,868 | Perry | Apr. 18, 1944 |
| 2,432,177 | Sedille | Dec. 9, 1947 |
| 2,613,500 | Lysholm | Oct. 14, 1952 |
| 2,861,639 | Grosselfinger | Nov. 25, 1958 |